No. 12,236. REISSUED JUNE 28, 1904.
E. BOMMER.
SPRING HINGE.
APPLICATION FILED NOV. 23, 1901.
2 SHEETS—SHEET 1.
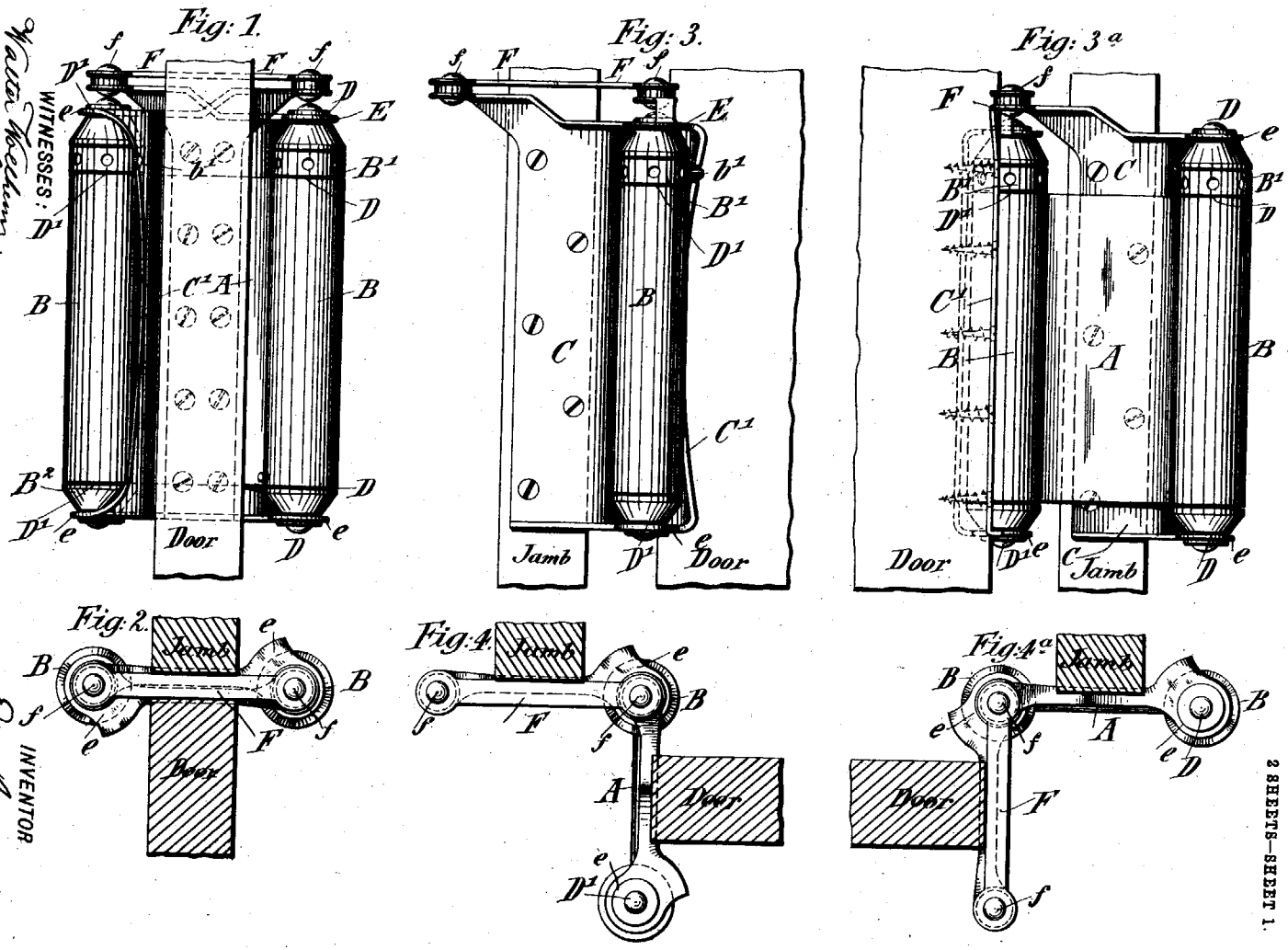
WITNESSES:
Walter Wechem.
Henry Suhrbier.
INVENTOR
Emil Bommer
BY Grover & Wable
ATTORNEYS
THE NORRIS PETERS CO., PHOTO-LITHO., WASHINGTON, D. C.

No. 12,236. REISSUED JUNE 28, 1904.
E. BOMMER.
SPRING HINGE.
APPLICATION FILED NOV. 23, 1901.
2 SHEETS—SHEET 2.
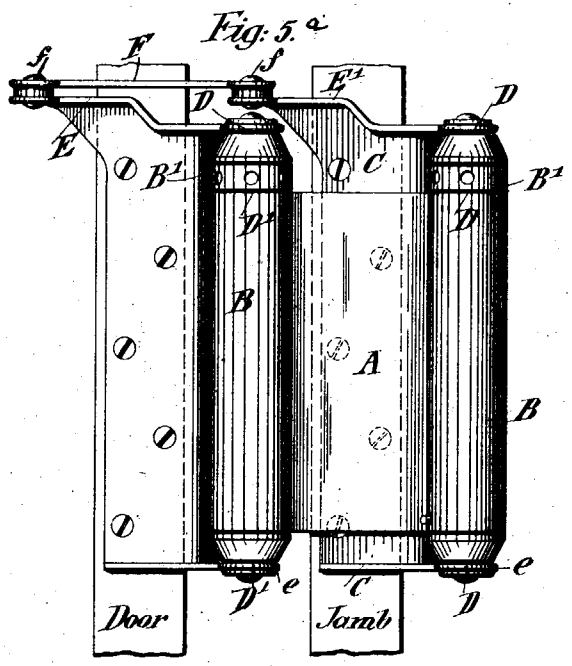
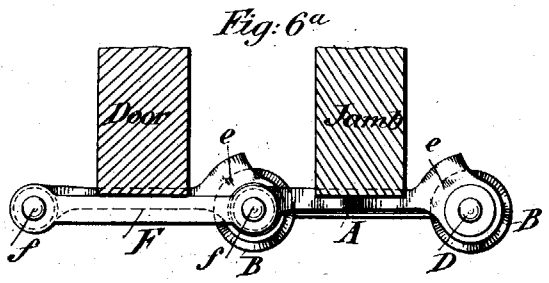
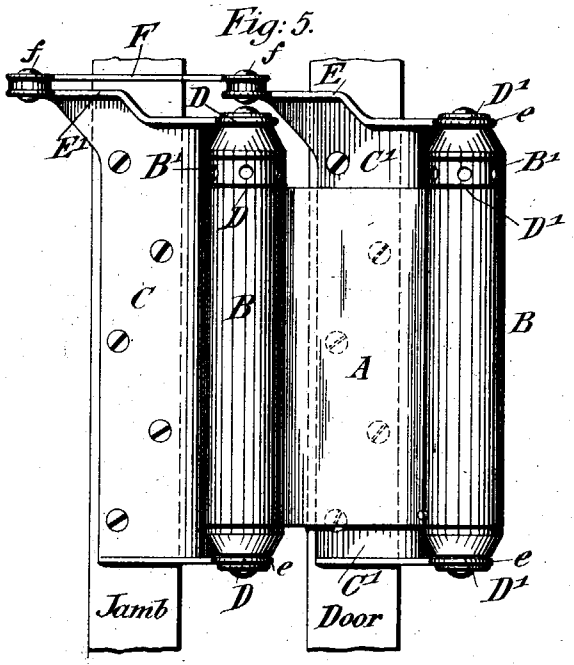
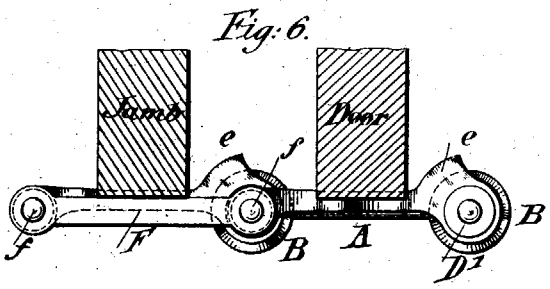
WITNESSES:
Walter Woeckheim
Henry Suhrbier.
INVENTOR
Emil Bommer
BY Geneck & Wahle
ATTORNEYS
THE NORRIS PETERS CO., PHOTO-LITHO., WASHINGTON, D. C.

No. 12,236. Reissued June 28, 1904.

UNITED STATES PATENT OFFICE.

EMIL BOMMER, OF BROOKLYN, NEW YORK.

SPRING-HINGE.

SPECIFICATION forming part of Reissued Letters Patent No. 12,236, dated June 28, 1904.

Original No. 636,948, dated November 14, 1899. Application for reissue filed November 23, 1901. Serial No. 83,387.

*To all whom it may concern:*

Be it known that I, EMIL BOMMER, a citizen of the United States, residing in New York, borough of Brooklyn, and State of New York, have invented certain new and useful Improvements in Spring-Hinges, of which the following is a specification.

This invention relates to certain improvements in spring-hinges, and more especially to spring-hinges of that class which are known as "double-acting" spring-hinges. One of the objections to spring-hinges of this class is their tendency to permit the door to sag—that is to say, to hang somewhat out of a perpendicular position. This sagging is caused in most cases by the use of spring-hinges of too small a size for the door hung thereon, so that the spring-power is not sufficient to overcome the weight of the door and hold the same up against the jamb or casing and at the same time swing the door back to place after it is opened in either direction. When such hinges of insufficient size and power are used, the result is that by the weight of the door the springs of the upper hinge "give" somewhat and permit thereby the door to sag. Another cause of sagging is the gradual yielding of the springs after they have been used for some time. In this case the springs of the upper hinge yield first, so as to produce the hanging of the door out of perpendicular position.

The object of this invention is to overcome this defect which is usually found in connection with double-acting spring-hinges; and for this purpose the invention consists of a double-acting spring-hinge comprising two spring-barrels, a web connecting said spring-barrels, flanges attached, respectively, to the door-jamb and door and provided with extension-brackets, a strap or link connected by pivots with the ends of said brackets, the distance between the axes of the pivots being equal to the distance between the axes of the spring-barrels; and the invention consists, further, of certain details of construction, which will be fully described, and finally pointed out in the claims.

In the accompanying drawings, Figure 1 represents a front elevation of my improved double-acting spring-hinge, showing the door in closed position. Fig. 2 is a plan view of Fig. 1. Fig. 3 is a side elevation of the spring-hinge, showing the door swung into a partly-open position through an angle of ninety degrees toward the right. Fig. 4 is a plan view of Fig. 3. Fig. $3^a$ is a similar side elevation showing the door swung through an angle of ninety degrees toward the left. Fig. $4^a$ is a plan view of Fig. $3^a$. Fig. 5 is a side elevation of my improved spring-hinge, showing the door swung into entirely-open position through an angle of one hundred and eighty degrees toward the right. Fig. 6 is a plan view of Fig. 5. Fig. $5^a$ is a side elevation showing the door swung into entirely-open position through an angle of one hundred and eighty degrees toward the left. Fig. $6^a$ is a plan view of Fig. $5^a$.

Similar letters of reference indicate corresponding parts.

Referring to the drawings, A represents the web of a double-acting spring-hinge of the ordinary construction.

B B are the barrels at each end of the web, C C′ the flanges, and D D′ the pintles which pass through the center of the barrels and the helical springs placed in the same. The flanges C C′ are provided at the upper ends with bracket-shaped extensions E E′, which are made integral with the same, said flanges being made either of cast metal or of sheet metal stamped up by suitable dies. The extension-brackets E E′ are arranged with perforations in their ends, the distance between the centers of which is equal to the distance between the axes of the hinge-pintles D D′ or barrels B B. The extension-brackets E E′ are raised over the heads of the pintles D D′ and are connected by a strap or link F, which is pivoted at its ends to the perforated terminals of the extension-brackets E E′. The flanges C C′ are attached by screws to the door and door-jamb, respectively. The pivots *f f*, which connect the extension-brackets E E′ and the strap or link F, are preferably enlarged or upset at their ends, washers being preferably interposed between the ends of the brackets and strap or link. The pivot strap or link F connects the extension-brackets E E′ of the two flanges of the double-acting spring-hinge and prevents effectually the sagging of the door, as it acts in the nature of a brace which connects the flange attached to the door with the flange applied to the jamb of the door-casing. By the extension-brackets and the strap connection of the same the sagging of the door is prevented entirely even when a door of greater weight is hung to double-acting spring-hinges of smaller size than required for such a door, while it absolutely prevents the sagging of a door supported by spring-hinges of a size corresponding to its weight. Whatever be the position of the double-acting spring-hinge, whether the door be swung toward the right or left into partly open or closed or entirely open or closed position, the brackets and the connecting strap or link will always support the door hung to the hinges in a vertical position. The extension-brackets of the flanges and the connecting-strap form, therefore, important accessories to double-acting spring-hinges, by which their strength is considerably increased, the proper functioning of the same preserved, and the objectionable sagging of the door heretofore experienced with double-acting spring-hinges effectively overcome.

Having thus described my invention, I claim as new and desire to secure by Letters Patent—

1. A double-acting spring-hinge, consisting of two spring-barrels, a web connecting said spring-barrels, flanges connected one with each barrel and adapted to be attached respectively to a door-jamb and door, and provided each with an extension-bracket, and a connecting-strap pivoted to said extension-brackets, the length of said strap being equal to the distance between the axes of said spring-barrels, substantially as set forth.

2. A double-acting spring-hinge, consisting of two spring-barrels, a web connecting said spring-barrels, flanges, connected one with each barrel and adapted to be attached respectively to a door-jamb and door, and provided each with an extension-bracket, and forming a continuation of the same, a connecting-strap, and pivots connecting the ends of the extension-brackets and strap, the length of said strap between the pivots being equal to the distance between the axes of said spring-barrels, substantially as set forth.

EMIL BOMMER.

Witnesses:
PAUL GOEPEL,
JOSEPH H. NILES.